United States Patent [19]

Munck et al.

[11] Patent Number: 4,723,284

[45] Date of Patent: Feb. 2, 1988

[54] AUTHENTICATION SYSTEM

[75] Inventors: Robert G. Munck, Lexington; Steven E. Chapin, Chelmsford, both of Mass.

[73] Assignee: Prime Computer, Inc., Natick, Mass.

[21] Appl. No.: 466,128

[22] Filed: Feb. 14, 1983

[51] Int. Cl.⁴ .............................................. H04L 9/00
[52] U.S. Cl. ...................................... 380/25; 380/23; 380/30; 380/28
[58] Field of Search ............... 178/22.11, 22.08, 22.09, 178/22.11; 380/23, 24, 25, 28, 30; 235/379-382

[56] References Cited

U.S. PATENT DOCUMENTS

| | | | |
|---|---|---|---|
| 3,764,742 | 10/1973 | Abbott et al. | 178/22 |
| 3,971,916 | 7/1976 | Moreno | 235/61.7 B |
| 4,161,038 | 7/1979 | Wu | 365/145 |
| 4,193,061 | 3/1980 | Zoltai | 235/382 |
| 4,193,131 | 3/1980 | Lennon et al. | 178/22.08 |
| 4,223,403 | 9/1980 | Konheim | 375/2 |
| 4,306,111 | 12/1981 | Lu et al. | 178/22.11 |
| 4,310,720 | 1/1982 | Check, Jr. | 178/22.08 |
| 4,314,097 | 2/1982 | Campbell | 178/22.08 |
| 4,317,957 | 3/1982 | Sendrow | 178/22.08 |
| 4,326,098 | 4/1982 | Bouricius | 178/22.08 |
| 4,349,695 | 9/1982 | Morgan et al. | 178/22.09 |
| 4,438,824 | 3/1984 | Mueller-Schloer | 178/22.08 |
| 4,446,519 | 5/1984 | Thomas | 178/22.08 |
| 4,453,074 | 6/1984 | Weinstein | 178/22.11 |
| 4,458,315 | 7/1984 | Vchenick | 178/22.08 |
| 4,471,163 | 9/1984 | Donald et al. | |

FOREIGN PATENT DOCUMENTS 1498283 1/1978 United Kingdom .

OTHER PUBLICATIONS

"Subscriber-Owned Terminals PRC Interface Specifications" by PRC.

Diffie, W. and Hellman, M. E. "New Directions in Cryptography" *IEEE Transactions on Information Theory*, IT-22, 6 (Nov. 1976), p. 644.

Rivest, Roho, Shamir, A., Adelman, L. "A Method for Obtaining Digital Signatures and Public Key Crypto-Systems", Comm. ACM., vol. 21, No. 2 (Feb. 1978). Scientific American, (Aug. 1982), pp. 67B, 68.

*Primary Examiner*—Salvatore Cangialosi
*Assistant Examiner*—Aaron J. Lewis
*Attorney, Agent, or Firm*—Lahive & Cockfield

[57] ABSTRACT

The present invention is directed to a hardware authentication system for a public key communications network. The public key network includes at least one user terminal and at least one hardware authentication terminal coupled by a communications medium. The authentication terminal generates and stores a plaintext message M, and generates from this message M a ciphertext message C by transforming the plaintext message M with the public key of the user terminal. The authentication terminal is further adapted to transmit the ciphertext message C by way of the medium to the user terminal.

The user terminal is adapted to receive the enciphered or ciphertext message C from the hardware authentication terminal, and transform that ciphertext message with its private key to obtain a plaintext message M'. The user terminal is further adapted to transmit the plaintext message M' by way of the medium to the authentication terminal.

The authentication terminal also is adapted to receive the plaintext message M' from the user terminal and compare that received plaintext message M' with the stored plaintext message M. Upon identifying that the messages M and M' match., the authentication terminal generates an authentic user signal indicating that the user terminal is the hardware terminal associated with the public key.

In some forms of the invention, the authentication terminal also, or alternatively, may authenticate whether or not a remote terminal includes a digital computer operating under the control of a specific software program.

7 Claims, 2 Drawing Figures

AUTHENTICATION SYSTEM

BACKGROUND OF THE INVENTION

The field of this invention is data communications, and more particularly, relates to authentication of remote terminals, including computers, in a communications system.

Access control and authentication of remote users has been a problem of increasing importance, particularly in the field of electronic funds transfer (EFT), and other fields requiring secure data communications. The National Bureau of Standards has adopted the data encryption standard (DES) as a relatively efficient, in terms of hardware and time, method of encrypting data for transmission. However, the DES is presently believed to have an insufficient degree of security for many users, and presents problems in the area of key distribution.

There are other more secure types of systems known in the prior art, such as those known as public key systems. In general, the public key system includes a plurality of terminals coupled by a communications medium, where each terminal has an associated encryption procedure (or transformation or operator) E and different decryption procedure (or transformation or operator) D, which may be applied to a message M. These transformatins E and D are related so that $E(M)=C$ and $D(C)=M$. Moreover, pairs of transformations E and D are relatively easy to generate, but D is substantially not derivable from E. As used herein, the term "substantially not derivable" means not practically feasible. In addition, the encryption transformation and the decryption transformation are inversly related so that $E(D(M))=D(E(M))=M$. An encryption transformation meeting these conditions is referred to as a trapdoor, one-way function.

Each terminal may generate his own encryption key, decryption key pair (E,D). By way of example, a first terminal (denoted A) may be characterized by an encryption key $E_A$ and a decryption key $D_A$, and a second terminal (denoted B) may be characterized by an encryption key $E_B$ and a decryption key $D_B$. In a typical public key system, the encryption keys $E_A$ and $E_B$ are made publically available, while the decryption keys are kept secret by the respective terminals. Terminal A may then use terminal B's encryption key to send an encrypted message $C(=E_B(M))$ to terminal B over an open, or non-secure, channel. Since only terminal B knows $D_B$ and $D_B$ is substantially not derivable from $E_B$, only terminal B can determine the message content of the encrypted message by reverse transforming C, i.e. $D_B(C)=D_B(E_B(M))=M$.

Moreover, if terminal A had further encoded C with its secret decryption key (i.e. $D_A(E_B(M))=C$), then terminal B can decode the message using terminal A's known encryption key ($E_A$) and its own secret decryption key $D_B$ to obtain the message M, i.e. $E_A(D_B(C))=M$, and be assured that only terminal A could have authored the message (since only terminal A could generate a message that could be decoded with $E_A$). For example, see Trans. Inform. Theory, IT-22, 6 (November 1976).

The integrity of public key systems is primarily dependent on the degree of confidence in the one-way trap-door function. There are two generally known approaches to the one-way trap-door function. The first, using knapsack functions, has been proposed by R. Merkle and M. Hellman. Another, referred to as the RSA Technique, is based on the difficulty of factoring large composite numbers. See Rivest, et al., "A Method for Obtaining Digital Signatures and Public Key Cryptosystems", Comm. ACM, Vol. 21, No. 2 (February 1978). While all the known approaches may be considered to be "breakable" in some sense (for example, by trial and error), at this time the RSA technique system appears somewhat more secure than other known cryptographic techniques. See Scientific American, (August 1982), p. 67B, 68.

However, while the public key systems are considered to be much more secure than the DES based systems, the known public key systems are considerably slower operating than are the DES-based systems. As suggested by the Rivest, et al. paper cited above, a public key system can be used on a short-term basis to distribute keys for a more conventional DES-type system that is used for long-term data links. However, short of using the doubly complex (and correspondingly slow) public key digital signature approach to ascertain the authenticity of a user, there are no efficient methods in the prior art to accomplish this task.

Accordingly, it is an object of the present invention to provide an improved authentication system which permits authentication of a remote user so linked terminals can be sure that users are who they say they are, and so that as a consequence, DES or other hardware- and time-efficient encryption techniques may be used with relatively high confidence level.

It is another object to provide an improved authentication system which permits confirmation that a remote terminal including a programmed computer is in fact using the program that it asserts that it is using.

SUMMARY OF THE INVENTION

Briefly, the present invention is directed to a hardware authentication system for a public key communications network. The public key network includes at least one user terminal and at least one hardware authentication terminal coupled by a communications medium. The user terminal is characterized by a public key and an associated private key, where the private key is substantially not derivable from the public key and is stored in the terminal in such a way that it cannot be accessed or used in any way other than those described below.

The authentication terminal generates and stores a plaintext message M, and generates from this message M a ciphertext message C by transforming the plaintext message M with the public key of the user terminal. The authentication terminal is further adapted to transmit the ciphertext message C by way of the medium to the user terminal.

The user terminal is adapted to receive the enciphered or ciphertext message C from the hardware authentication terminal, and transform that ciphertext message with its private key to obtain a plaintext message M'. The user terminal is further adapted to transmit the plaintext message M' by way of the medium to the authentication terminal.

The authentication terminal also is adapted to receive the plaintext message M' from the user terminal and compare that received plaintext message M' with the stored plaintext message M. Upon identifying that the messages M and M' match, the authentication terminal generates an authentic user signal indicating that the user terminal is the hardware terminal associated with the public key.

In some forms of the invention, the authentication terminal also, or alternatively, may authenticate whether or not a remote terminal includes a digital computer operating under the control of a specific software program. In the latter form, the user terminal includes the digital computer, purportedly operating under control of that specific program. The user terminal is adapted to receive inquiry signals on a periodic basis from a software authentication terminal. The user terminal is responsive to such inquiry signals for generating a remote program (RP) (or vector) signal representative of the current operational status of the program being run by its associated digital computer. That remote program signal is transmitted to the software authentication terminal.

The software authentication terminal is adapted to periodically generate the inquiry signals, and transmit those inquiry signals to the remote user terminal. The software authentication terminal further generates a local program (LP) signal representative of the expected state of the program controlling the digital computer at the remote user terminal. As used herein, the term "state" means the static text of the program or a condensation or summary thereof, the current dynamic data of the program or a condensation thereof, the current locus of execution, or a combination of these. At the software authentication terminal, the remote program signal is compared with the local program signal. A software authentication signal is generated only when the compared signals match, indicating that the remote user terminal is in fact using the software expected by the software authentication terminal.

In various forms of the invention, the hardware and software authentication systems may be used together or separately.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
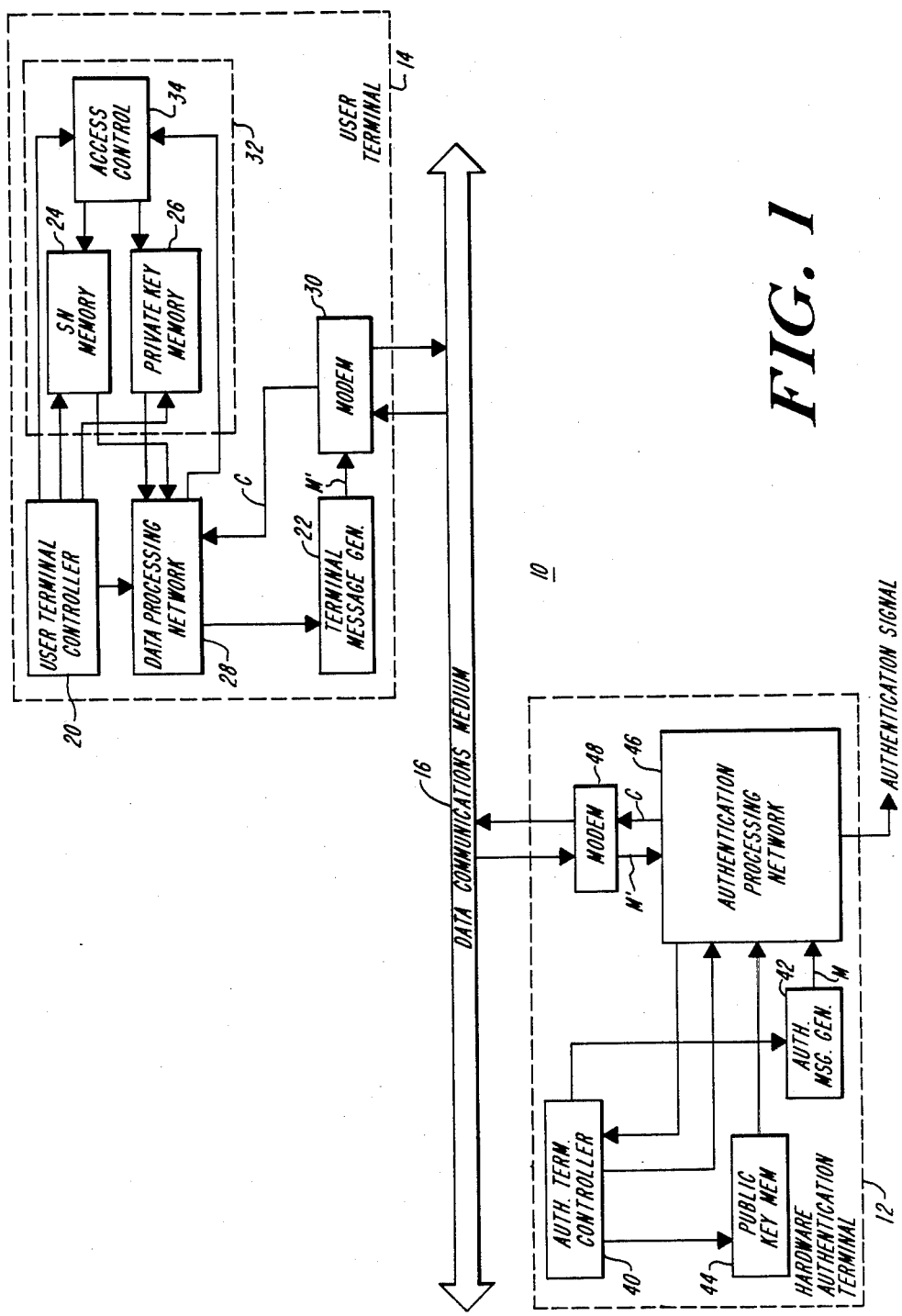
FIG. 1 shows in block diagram form an exemplary embodiment of one form of the present invention.

FIG. 1 shows a user authentication system 10 within a public key communications network. The system 10 includes a hardware authentication terminal 12 and a user terminal 14 coupled by a data communications medium 16. Each of terminals 12 and 14 include associated modems which permit coupling to the medium 16 in a conventional manner.

In the present embodiment, the user terminal is characterized by a public key $E_u$ and a private key $D_u$. Terminal 14 includes a controller 20, a terminal message generator 22, a serial number (SN) memory 24, a private key memory 26, a data processing network 28, and a modem 30.

The hardware authentication terminal 12 includes a controller 40, an authentication terminal message generator 42, a public key memory 44 and authentication and processing network 46 and a modem 48.

In order to authenticate that the user terminal is who it says it is, the authentication terminal 12 operates under the control of its controller 40 to extract the user terminal's encryption key from memory 44 and transfers that public key to network 46. Controller 40 also directs generator 42 to generate a plaintext message M which is transferred to network 46. The authentication processing network 46 generates a ciphertext message C ($=E_u(M)$) and transfers that ciphertext message by way of modem 48 and medium 16 to the user terminal 14.

At terminal 14, the received message C is transferred by modem 30 to the data processing network 28 where, under the control of controller 20, the private key from memory 26 is applied to transform that signal to a plaintext message $M'(=D_u(C))$. This plaintext message M' is transferred by way of modem 30 and the communication medium 16 back to the authentication terminal 12. At terminal 12, the plaintext message M' is transferred by way of modem 48 to the authentication processing network 46, where that signal M' is compared with the original message M. When the comparison indicates that the received message M' matches the initial message M, then an authentication signal is generated indicating that the authentication terminal 12 has verified that user terminal 14 is the desired user terminal which it purports to be.

Thus, with this configuration, the authentication terminal provides a method for authenticating the identity of a user terminal with whom it is communicating in a manner permitting a plaintext message to be transmitted in at least one direction of the two-way communication interchange, resulting in a relatively highly efficient process for the authentication of the user compared with the methods of the prior art (including the digital signature approach of the conventional public key system).

Figure 2:
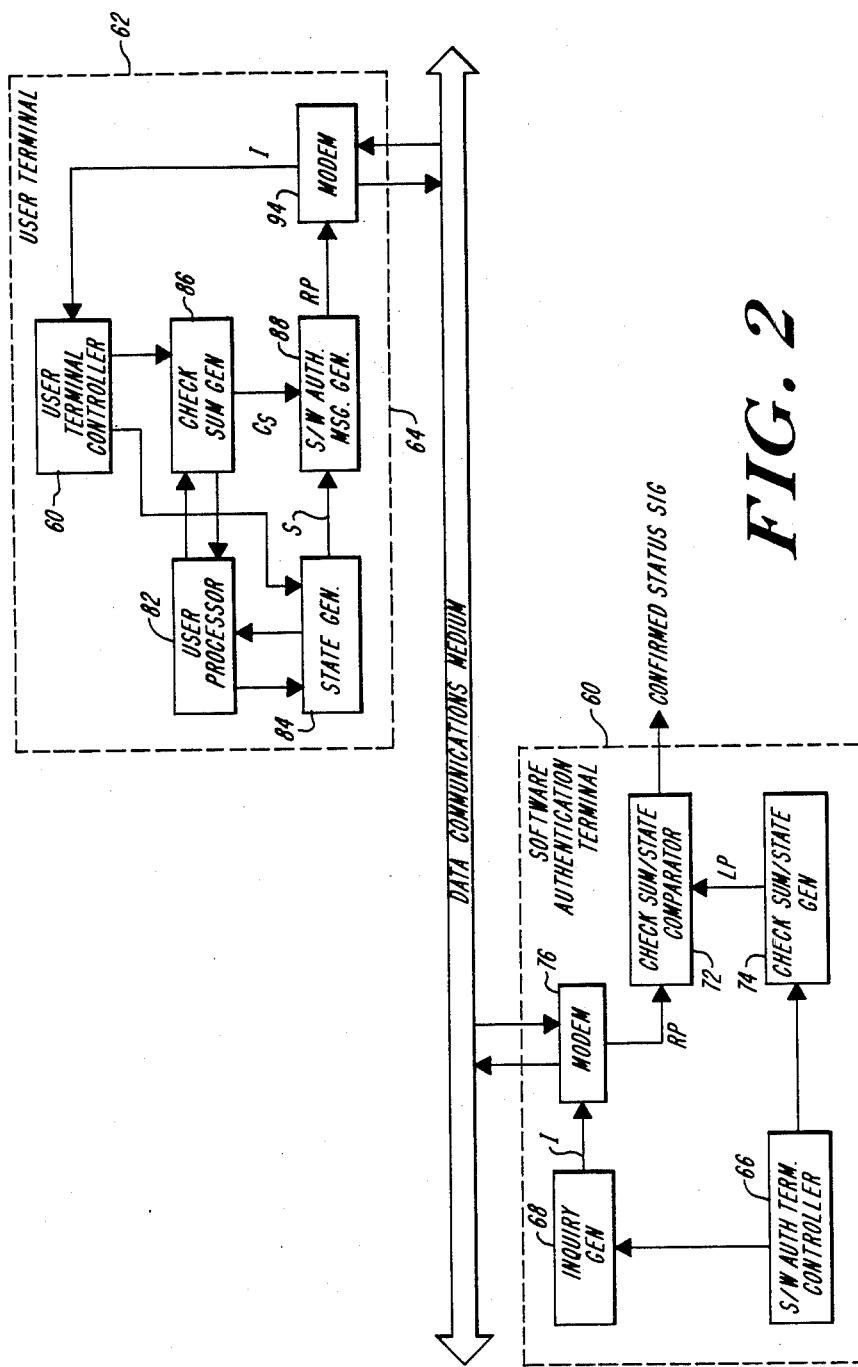
FIG. 2 shows in block diagram form an exemplary embodiment of a second form of the invention.

FIG. 2 shows a system in which a software authentication terminal 60 may confirm that a remote user terminal 62 includes a computer which is operating under the control of a specific software program. In FIG. 2, the software authentication terminal 60 is coupled by way of a data communications medium 64 to the remote user terminal 62. The authentication terminal 60 includes a software authentication terminal controller 66, an inquiry generator 68, a checksum/state comparator 72, a checksum/state generator 74, and a modem 76.

The user terminal 62 includes a user terminal controller 80, a user processor 82, a state generator 84, a checksum generator 86, a software authentication and message generator 88, and a modem 94.

The software authentication terminal confirms that the user processor 82 is operating under the control of a specific program. In operation, the software authentication terminal controller 66 periodically directs the inquiry generator 68 to transmit by way of modem 76 inquiry signals I (requesting the state of the processor 82) to the user terminal 62. As used herein, the term "state" means the static text of the program or a condensation or summary thereof, the current dynamic data of the program or a condensation thereof, the current locus of execution, or a combination of these. In the present embodiment, the inquiry signal I requests that a predetermined checksum or status word be returned to terminal 60. However, for added security against eavesdroppers, the inquiry signal may designate to terminal 62 a randomly specified checksum, or algorithm (stored at terminal 62) for use in generating the checksum. In the latter cases, even if the eavesdropper were to recognize the inquiry signal as such, he would be unable to determine a counterfeit response that would fool terminal 60.

In the present embodiment, each inquiry signal is received terminal 62, and transferred by way of modem 94 to the user controller 80. Upon the receipt of the inquiry signal, the user controller 80 initiates activity by the checksum generator 86 and the state generator 84 to respectively generate a check sum signal (CS) (for example, which corresponds to the sum of all codes or a vector representative of the codes presently in certain registers of the user processor 82) and to generate a state signal (S) representative of the state of that processor. The CS and the S signals are applied to the software authentication message generator 88 which provides a remote program signal representative of the two component CS and S signals. This composite RP signal is transmitted by way of modem 94 over medium 64 to the software authentication terminal 60.

The received signal at terminal 60 is demodulated by modem 76 to the form of the remote program (RP) signal. That RP signal is applied to the checksum/state comparator 72. The software authentication terminal controller 66 generates corresponding checksum and state signals CS' and S', respectively, in generator 74 which are combined to form a local program (LP) signal representative of the expected state of the user terminal 62, assuming that terminal 62 is properly using the expected software. The LP signal is applied to the comparator 72. When the respective check sum and state signals (i.e. the LP and RP signals) match, the comparator 74 generates a confirmed status signal representative of confirming the status that the user terminal is in fact operating under the control of the desired software program.

Although the disclosed embodiment illustrates a system in which both a checksum and a state are determined for the user terminal upon inquiry from the authentication terminal 60, it will be understood that in some forms of the invention, either of these signals will be sufficient to identify to the terminal 60 that the user terminal 62 is in fact using the software program desired.

Although the system of Fig. is shown to be operative over medium 64 in plain text, DES-based encryption or some alternative form could be used for interterminal communications. In any event, the software authentication in FIG. 2 may be operated in conjunction with the hardware authentication system of FIG. 1 so that a central authentication terminal may confirm that a remote user terminal is in fact the hardware terminal which it represents itself to be, and further that a processor at that user terminal is in fact operating under the control of a specific program.

The hardware and private key may also be used to implement known public key system functions, such as distribution of DES keys, digital "signing" of a document, and general encryption for security reasons. See, for example, *Distributed Systems—Architecture and Implementation*, Lampson, B. W., M. Paul, and H. J. Siegert, Eds., Springer-Verlag, pp. 224–234, 240–242 (1981).

In the preferred form, the private key memory 26 of the user terminal 14 may be physically placed on a removable card 32, together with the serial number memory 24 and an access controller 34 adapted for interfacing to the controller 20. In this latter configuration, the memories 24 and 26 and control 34 are preferred to be located within a single integrated circuit chip which at the time of manufacture is loaded with a serial number (in memory 24) and a private key (in memory 26); the private key is not recorded anywhere but in the chip. The control 34 permits the serial number memory 24 to be accessed at any time by the controller 20. However, the private key memory 26 is a read-only memory which cannot be accessed by equipment external to the card 32. In this embodiment, the access control 34 is in communication with the data processing network 28 and operates to perform the comparison with the received signals from the hardware authentication terminal 12 and to perform the necessary decryption using the private key stored in memory 26. In this manner, once the description key is stored in the private key memory 26, there is no way it can be accessed by equipment outside the card, thereby greatly enhancing the security of the system. Since the serial number is accessible, outside equipment may interrogate the card 32 to identify which card it is, and then by means of a table look-up, for example, determine which public key is associated with that card.

By way of example, the card 32 may be used by an individual to identify himself to a computer system. The computer system can then interrogate the card to determine the serial number and then by table look-up determine the appropriate public key for that user.

While the preferred embodiments have been described in terms of one-way hardware and software authentication systems, other forms of the invention may include similar devices to permit two-way verification. For example, the similiar blocks to those shown in terminal 12 of FIG. 1 may also be at terminal 14 and similar blocks to those shown in terminal 14 may also be at terminal 12. As a result, each of terminals 12 and 14 may verify that the other is the terminal it represents itself to be. The software authentication system may be similarly configured to present two-way software authentication.

The invention may be embodied in other specific forms without departing from the spirit or essential characteristics thereof. The present or embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A user hardware authentication system for a public key digital data communications network comprising at least one user terminal and at least one hardware (H/W) authentication terminal coupled by a communications medium, said user terminal being characterized by a public key and an associated private key, said private key being substantially not derivable from said public key, wherein said user terminal includes means for storing said private key, means for receiving an enciphered message C from said H/W authentication terminal, means for transforming said received message C with said private key to obtain a plaintext message M', and means for transmitting said plaintext message M' by way of said medium to said authentication terminal, and wherein said authentication terminal includes means for generating and storing a plaintext message M, means for generating a ciphertext message C by transforming said plaintext message M with said public key, means for transmitting said ciphertext message C by way of said medium to said user terminal, means for receiving said plaintext message M' from said user terminal, means for comparing said plaintext message M' with said stored plaintext message M, and means for generating an authentic user signal indicating that said user terminal is the terminal associated with said public key only when said compared messages M and M' match.

2. The system of claim 1, further comprising:

a user software authentication system comprising at least one user terminal and at least one software (S/W) authentication terminal coupled by a communications medium, wherein said user terminal includes a digital computer receiving an inquiry signal I from said S/W authentication terminal, means responsive to said inquiry signal for generating a remote program (RP) signal representative of the current operational status of said program, and means for transmitting said remote program (RP) signal to said S/W authentication terminal, and wherein said S/W authentication terminal includes means for periodically generating inquiry signals and for transmitting said inquiry signals to said user terminal, means for generating a local program (LP) signal, means for receiving said remote program (RP) signal means for comparing said generated remote program (RP) signal and said local program (LP) signal and for generating a software authentication signal only when said RP and LP signals match.

3. A system according to claim 2 wherein said inquiry signed I is representative of a specific method for determining the form for said remote program (RP) signal related to the current state of said user terminal.

4. The system according to claim 1 wherein the portion of said user terminal including said storage means and said transforming means of said user terminal is removable from said user terminal and includes means for receiving said private key at the time of manufacture of said storage means.

5. The system according to claim 2 wherein the portion of said user terminal including said storage means and said transforming means of said user terminal is removable from said user terminal and includes means for receiving said private key at the time of manufacture of said storage means.

6. The system of claim 1, further comprising:

a user software authentication system comprising at least one user terminal and at least one software (S/W) authentication terminal coupled by a communications medium, wherein said user terminal includes a digital computer operating under the control of a program, means for receiving an inquiry signal I from said S/W authentication terminal, means responsive to said inquiry signal for generating a remote program (RP) signal RP representative of the current operational status of said program, and means for transmitting said remote program (RP) signal to said S/W authentication terminal, and wherein said S/W authentication terminal includes means for periodically generating inquiry signals and for transmitting said inquiry signals to said user terminal, means for generating a local program (LP) signal, means for receiving said remote program RP signal, means for comparing said generated remote program (RP) remote program (LP) signal and said local program (LP) signal and for generating a software authentication signal only when said RP and LP signals match.

7. A system according to claim 6 wherein said inquiry signal I is representative of a specific method for determining the form for said remote program (RP) signal related to the current state of said user terminal.

* * * * *